United States Patent [19]

Murray

[11] Patent Number: 5,270,957
[45] Date of Patent: Dec. 14, 1993

[54] COMPOSITE RANDOM SAMPLING

[75] Inventor: L. Craig Murray, Walnut, Calif.

[73] Assignee: Southern California Edison Co., Rosemead, Calif.

[21] Appl. No.: 649,558

[22] Filed: Feb. 1, 1991

[51] Int. Cl.$^5$ .................. G06F 15/21; G06F 15/42
[52] U.S. Cl. ..................... 364/554; 364/413.11; 364/551.01
[58] Field of Search ............ 364/554, 550, 551.01, 364/552, 555, 578, 400, 401, 402, 413.02, 413.11, 419

[56] References Cited

U.S. PATENT DOCUMENTS 5,103,408  4/1992  Greenberg et al. .......... 364/550
5,105,365  4/1992  McDaniel et al. .......... 364/550 X

OTHER PUBLICATIONS

L. C. Murray and A. E. Talley, "Composite Random Sampling—A Better Approach to Random Drug Testing", dated Dec. 13, 1988, submitted for publication.
*U.S. Department of Health and Human Services Publication*, Research Monograph Series 91, pp. 76–79, (1989). "Drug Use Trends in a Nuclear Power Company: Cumulative Data From an Ongoing Testing Program, National Institute in Drug Abuse".

*Primary Examiner*—Jack B. Harvey
*Assistant Examiner*—Edward Pipala
*Attorney, Agent, or Firm*—Sheldon & Mak

[57] ABSTRACT

An element is sampled from a defined group so that targeting can be effected within a range between a range greater than a first desired frequency and not more than a second desired frequency. Two data bases are established. The second data base contains elements not selected from the first data base. The element set for targeting is defined between element sets from the first data base and the second data base, thereby creating a composite random sampling of the elements. Testing can be effected on the target elements.

36 Claims, 6 Drawing Sheets

COMPOSITE RANDOM SAMPLING

BACKGROUND

Effective testing of humans for fitness for duty in the workplace is essential.

This invention relates to targeting elements. In particular, the elements are humans targeted for testing for fitness-for-duty.

Different techniques for sampling elements are known. The most common technique is simple random sampling. However, simple random sampling has inefficiencies. For a low sampling rate, there remains a high percentage of a population untested in defined time periods. On the other hand, an excessive sampling rate, for instance at about a 300% rate, provides for approximately 95% of the population to be tested but approximately 58% of the elements are tested three or more times. Hence, there is either a relatively ineffective testing program which does not ensure that a high number of persons in a group are tested, or a high-cost, low-productivity program that tests many people too many times.

In most random sampling, only a relatively small fraction of the total number of elements in a target population is measured. From data on these elements, conclusions or inferences are drawn about attributes of the entire population. However, in some instances, the objective of the sampling is to ensure that the population is meeting certain standards. Instead of examining only a small fraction of the population once, it is necessary to examine small fractions of the population on a regular basis. The end result is that nearly all of the population may be sampled over some period of time.

An area of sampling that requires a nearly complete enumeration of the population is the concern for public safety and employee safety in many businesses today. The reason for this concern is the emerging information about subtle yet long-lasting after-effects of drug use, which may go undetected by supervisors. This has raised the speculation that decision-making in emergency situations may be hampered by off-duty drug use. In response to this concern, fitness-for-duty drug screening urinalysis programs are being developed. In order to implement programs of this type, many businesses are beginning to conduct random drug testing throughout the year in addition to the more common pre-employment drug testing of applicants.

To address fitness-for-duty in the workplace, sampling must be conducted in such a manner as to ensure that the population is meeting certain standards. Instead of examining only a small fraction of the population once, it is necessary to examine small fractions of the population on a regular basis.

The prevalent approach to random drug testing is to use simple random sampling with replacement each time a random selection is made. The benefit of this approach is that each time a selection is made, all employees are equally likely to be selected. Repeated testing is needed to ensure that a screening program will be an effective deterrent against drug use.

However, there is also an adverse element to repeated use of simple random sampling. Depending upon the percentage of employees being chosen for testing, one of the following scenarios will occur:

(1) If the sampling rate is set high so as to minimize the probability of not choosing an employee during the year, then there also is a high repeat selection of some employees.

(2) If the sampling rate is lowered in order to reduce the high amount of repeat selection, then the probability of not choosing an employee during the year increases.

This invention is directed at providing a technique for overcoming the difficulties with simple random sampling. An advantage that this technique brings to a fitness-for-duty program is a balance between company standards and productivity.

SUMMARY

By the invention, there is provided a procedure, namely, composite random sampling, and a product for such sampling. This procedure and product retains the benefits of simple random sampling while eliminating the disadvantages. This procedure and product yields the same probability of selecting an individual at least once during the year as does simple random sampling. It also introduces a parameter in the sampling model which controls the probability of being selected two or more times.

According to the invention, there is provided a method and means of sampling from a defined group so that at least a minimum number of elements in the defined group are targeted at a first desired frequency and an overall number of elements are not targeted more than at a second desired frequency in a range.

The steps of the procedure include:
(a) establishing a first data base constituted by essentially all the elements of the defined group,
(b) establishing a second data base with initially all the elements of the first data base,
(c) selecting a first element set from the first data base and thereafter replacing the selected first element set in the data base so as to maintain the first data base essentially unchanged,
(d) removing from the second data base any element set existing in that data base selected from the first data base,
(e) selecting a second element set from the second data base,
(f) removing from the second data base element set selected from the second data base, and
(g) defining the first element set from the first data base and the second element set from the second data base as the target elements in the range.

In a preferred form of the invention, there is tracking of the selection of an element set from the second data base and reentering of a removed element back into the second data base after a predetermined time period of not being selected from either the first data base or the second data base.

The elements are preferably human beings for testing for fitness-for-duty in the workplace.

The invention covers both the method and product for achieving the desired composite random sampling. Also covered are situations where the elements are inanimate, and the elements are to be sampled for different purposes or characteristics such as quality.

The invention is further described with reference to the accompanying drawings.

DRAWINGS

FIGS. 5a and 5b are component parts of a flow diagram illustrating the logic process for composite random sampling according to the invention.

DESCRIPTION

A method and product of sampling an element set such as human beings from a defined group of human beings is provided. At least a minimum number of human beings in the group are targeted at a first desired frequency. An overall number of human beings in the group are not targeted at more than a second desired frequency to create a range comprised of several steps.

The objective is to have a first criteria or frequency set of at least a minimum number of humans tested, say 95%. This would mean that at least about 5% of the persons will not be tested in a given time period, for instance, a year. The second criteria or desired frequency is an indication of not wanting to test a group of people more than say three times a year. The range is thereby created in this example as being between 0 and 3.

A first data base is established constituted by essentially all the humans of the defined group of humans. This is a data base of all the humans to be tested.

A second data base is established with initially all the elements of humans of the same first data base. The method then proceeds whereby a first human set is selected from the first data base. Thereafter, the selected first element set is replaced in the first data base so as to maintain that first data base essentially unchanged. This data base is thus one where there is replacement of elements in the data base.

The second data base is developed differently. Any element or human being set existing in that data base which has been selected from the first data base is removed. The second data base is thereby a shrinking base, or a base constructed without replacement. In the targeting process, a second human element set is progressively selected from the second data base.

There is then defined the target elements in the range. There are the first element set from the first human element set from the first data base and the second human element set from the second data base. This procedure constitutes composite random sampling. If elements were to be taken only from the first data base, this would be simple random sampling, or simple random sampling with replacement. If elements were to be taken from only the second data base, this would be simple random sampling without replacement. The method and means for sampling according to the invention is a combination of these two sampling techniques and is hence termed composite random sampling.

The targeting of the humans or the distribution of the targeted element in the range can vary. By selectively varying the amount of first element set relative to the amount of second element set as the target elements, different frequency distributions of the sample set is obtained. The greater the number of the first element set, namely, the set with replacement that is in the targeted elements of the range, the more frequently will different numbers of elements in the range be subject to targeting.

Figure 1:
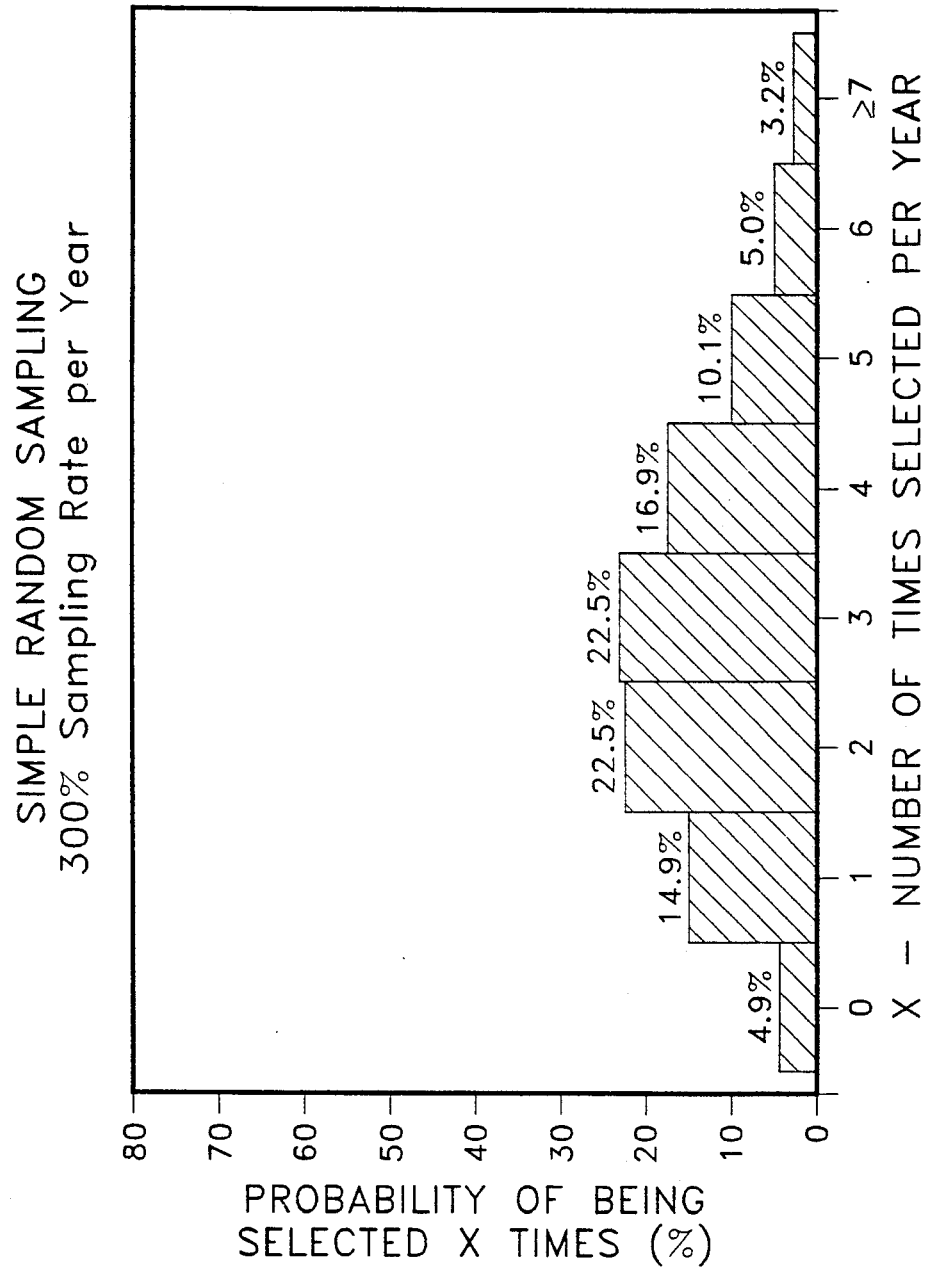
FIG. 1 is a prior art technique showing simple random sampling at a rate that allows for approximately 5% of the population to remain untested at the end of a year.
Figure 4:
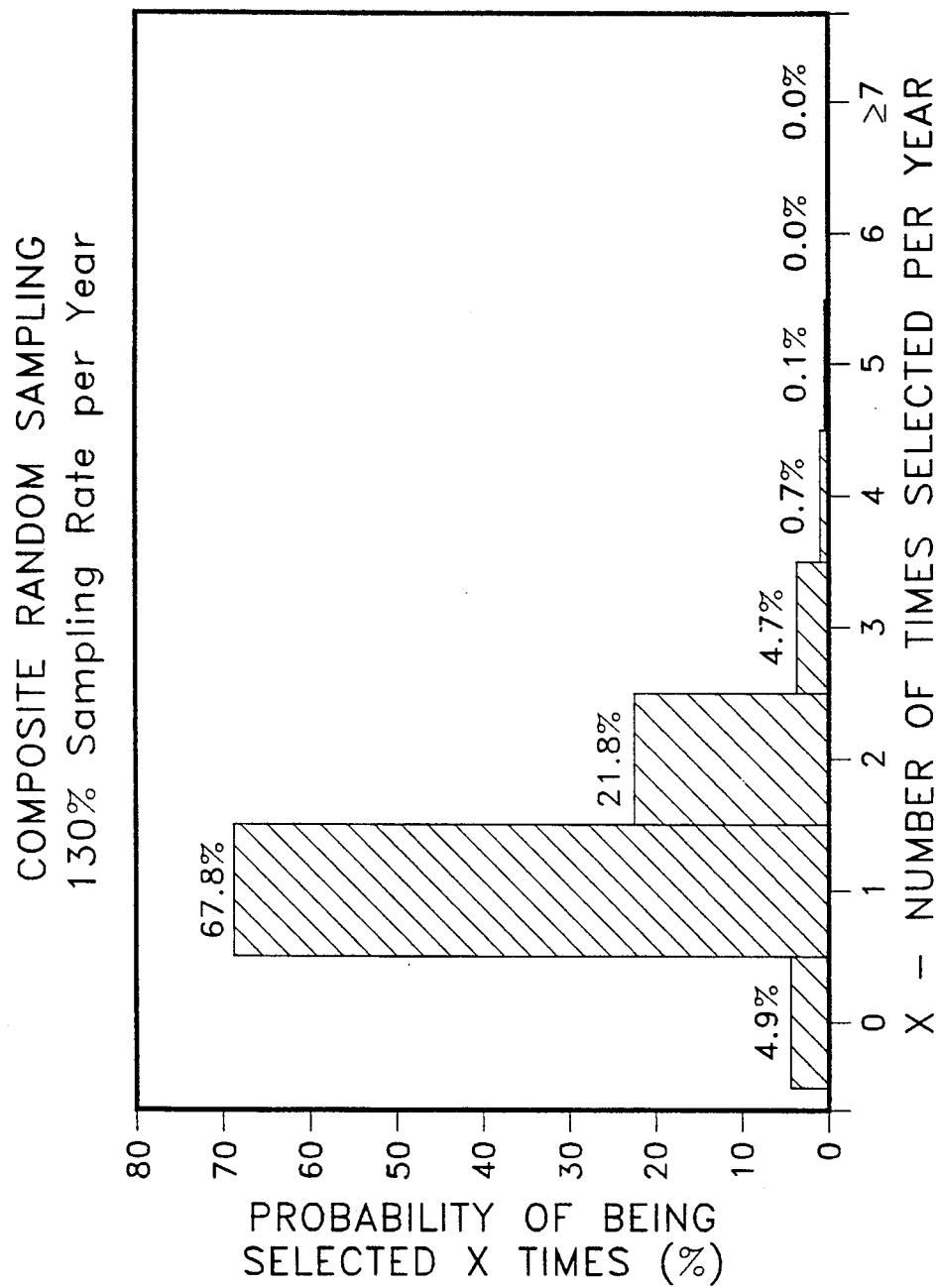
FIG. 4 is a graphical representation indicating the different composite random sampling distributions possible according to the invention with changes in $\alpha$ from 0 to 1 with $p_0$ fixed at 5%.

Thus, in the example illustrated in FIG. 4 where $\alpha$ is 0.00 where the rate of yearly sampling is 300%, the distribution is that 5% of the population will be sampled 0 times, 15% of the population will be sampled once, 22% of the population will be sampled twice, and 58% of the population will be sampled more than three times. The 300% frequency rate would represent submitting the defined group to sampling to an extent three times greater than the number of persons in the group. Thus, if there are 100 persons in the group, there would have to be 300 samplings taken to obtain this distribution. This example is essentially a prior art histogram as illustrated in FIG. 4. The detail of the histogram of FIG. 4 is illustrated in FIG. 1 in more detail. The distribution of human beings sampled more than three times is broken down to show the sampling of three times per year, four times per year, five times per year, six times per year and seven times per year.

Figure 2:
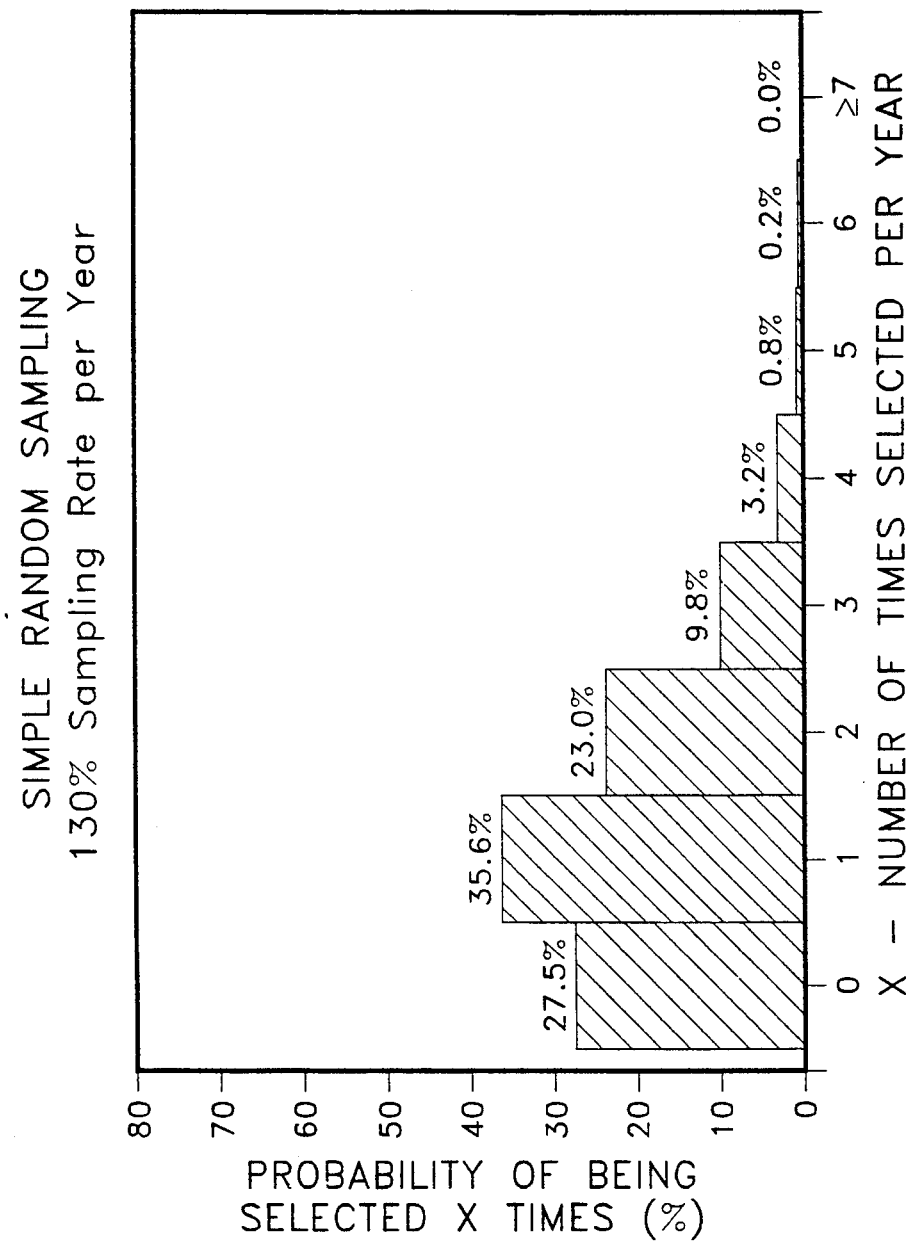
FIG. 2 is a prior art technique showing simple random sampling at a rate equal to that used for composite random sampling according to the invention with $\alpha=0.5$ and $p_0=5\%$.

By review of FIG. 2, the prior art technique of simple random sampling can be shown where there is a 130% sampling rate per year. This means that in a defined group of 100 persons, 130 samples are effected in the year. This situation shows that 27.5% of the population would not be sampled at all, 35.6% of the population would be sampled once, 23.0% of the population would be sampled twice and 9.8% of the population would be sampled three times. The effect of this simple random sampling technique indicates a distribution where a large percentage of the population is never sampled, particularly in the fitness-for-duty requirements in the workplace. This is undesirable.

Figure 3:
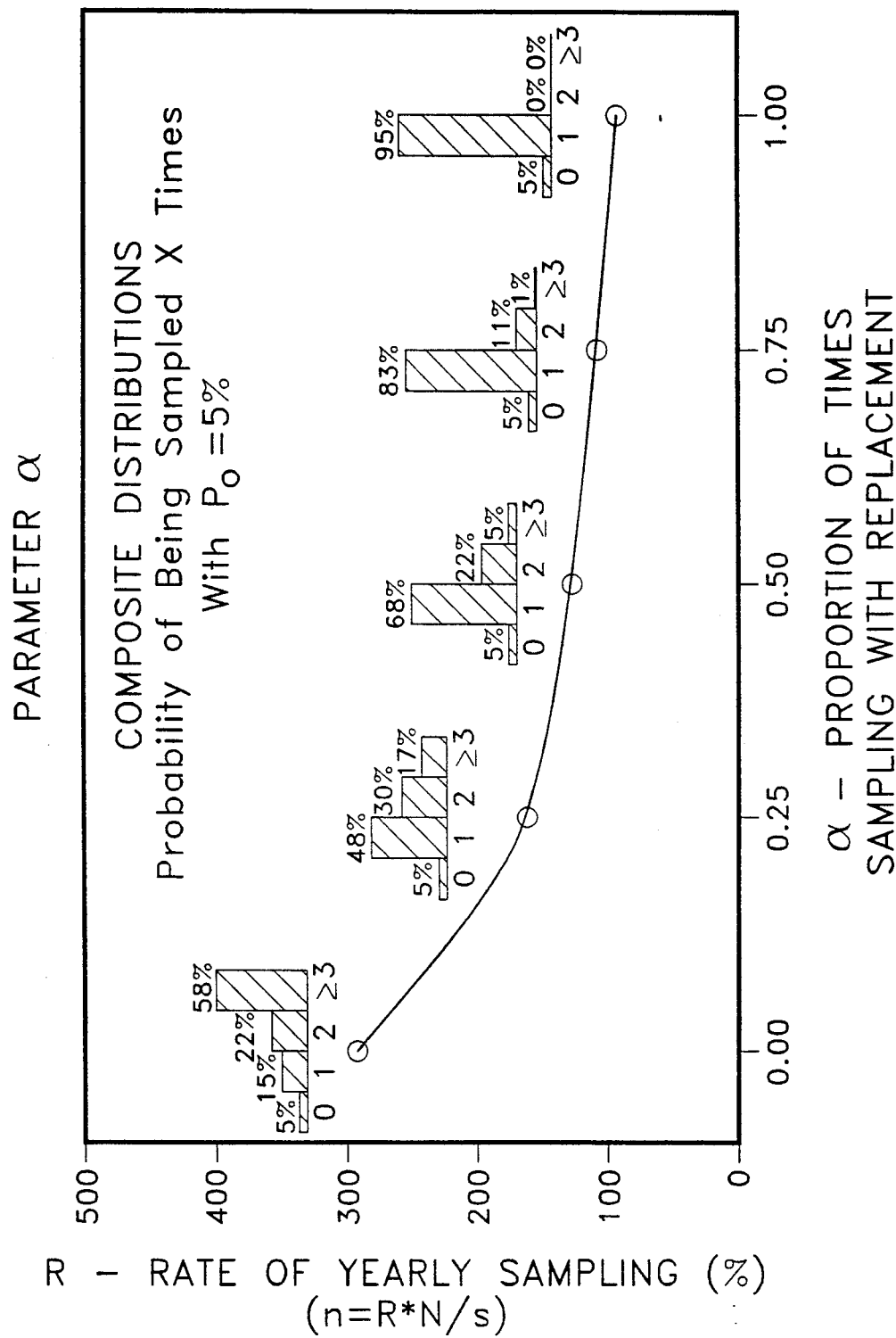
FIG. 3 is a graphical representation illustrating composite random sampling according to the invention at a rate that allows for approximately $p_0=5\%$, namely 5% of the population remains untested at the end of a year.

By adopting the techniques of the present invention whereby a second data base is interfaced with the first data base, the overall predetermined frequency distribution is improved. In FIG. 3, a comparison is made with the equivalent sampling rate in FIG. 2. This FIG. 3 is also illustrated in FIG. 4 where $\alpha$ is set at 0.50.

This means that 4.9% of the population will not be tested at all in a given time period. 67.8% of the population will be tested once, 21.8% of the population will be tested twice, and 4.7% of the population will be tested three times. This distribution is highly desirable since about 95% of the population is tested once, twice or three times. Yet, the rate of yearly sampling is only about 130% of the population of the defined group. To achieve the same effect with the simple random sampling technique, a rate of yearly sampling was about 300%. The reduction of the rate of yearly sampling from 300% to 130% provides a considerable cost saving of manpower in providing tests both from a personnel and hardware perspective.

As illustrated further in FIG. 4, the predetermined frequency distribution can be adjusted to suit any desirable circumstance. Thus, if the rate of yearly sampling was reduced to 95%, this would mean that a prior art technique is being used where the simple random sampling process is being adopted without replacement. In other words, the sampling is being effected only from the second data base. As can be seen in FIG. 4, 5% of the population is not tested and 95% of the population is tested once. However, no part of the population is tested more than once. This is undesirable for the workplace since once a person is tested once, he would know then that there would be no need to worry in a future time because testing on that person would not be effected again in the predetermined time.

Ideally, the composite random sampling is effected in a range no greater than about 150% of the relative number of elements in the group.

The process includes a procedure to track the selection of an element set from both data bases. This means that as human elements are selected from either data base, these are monitored. Reentering of removed human elements back into the second data base is effected after a predetermined time period of not being selected from either the first data base or the second data base.

Moreover, there are means provided to adjust the selection from the first data base and the second data base to account for changes in the defined group. The changes could be increases or decreases in the group. The adjustment includes a step of adding additional elements to or removing preexisting elements from the first data base. It also includes adding additional elements to or removing preexisting elements from the second data base. The additional elements become available to the group after initiation of the initial establishment of the first data base and the second data base. The preexisting elements are elements which leave the group after initiation of the first data base and the second data base. In this manner, humans which join the population after initiation of the sampling can be added into the composite sampling technique. Similarly, humans who leave the population group either by departure from the group or for temporary absence are removed from the sampling technique.

The second data base is essentially a subset of the first data base. The targeted elements are subjected to a predetermined test and where the element is a human being, the test can be a qualitative or quantitative test such as a performance test or medical test or a test for substance abuse. In other situations where the element is inanimate such as a physical structure in a defined group, different quality controls can be applied to the element according to the composite random sampling technique described.

The invention is now described with greater detail with reference to fitness-for-duty testing in a population of employees.

POPULATION DEFINITION

The concept of composite random sampling is to select $100\alpha$ percent ($0 \leq \alpha \leq 1$) of the time from the population of employees in which each employee can be chosen only once within a fixed period of time, usually a year. This single-selection population is denoted as $P_1$. The remaining percent of the time, $100(1-\alpha)$ is selected from the total population of employees, in which each employee can be chosen one or more times. This multiple selection population is denoted as $P_M$. In other words, $P_1$ and $P_M$ represent the same target population sampled without replacement and with replacement, respectively.

In order to use composite random sampling, when each employee was last tested should be known. For this reason, it is assumed that the data file of employees accessed for the random selection reveals the date the employee was last tested. It also is assumed that repeated random sampling occurs during a year.

PROBABILITY DISTRIBUTION

The composite probability distribution is similar to the binomial distribution and hence, easy to use when examining the expected outcomes of various sample sizes. If X denotes the number of times an employee has been sampled during the year, then the probability of not being selected can be expressed as follows:

$$P(0) = 1 - \left[ \frac{1}{1-\alpha} \left[ 1 - \left[ 1 - \frac{(1-\alpha)n}{N} \right]^s \right] \right]$$

and the probability distribution of the number of times an element has been selected is defined according to (g) is effected according to:

$$P(X) = \frac{1}{1-\alpha} \binom{s}{x} \left[ \frac{(1-\alpha)n}{N} \right]^x \left[ 1 - \frac{(1-\alpha)n}{N} \right]^{(s-x)}$$

$$x = 1,2,3,\ldots,s$$

where
- $\alpha$ is the proportion of the target elements taken from the second data base, $P_1$,
- n is the number of target elements,
- N is the number of elements in the first data base,
- s is the number of samples per predetermined time period, and
- P is the probability of selection of an element.

Since the composite distribution is a combination of sampling without replacement ($100\alpha$ percent) and with replacement ($100(1-\alpha)$ percent), it is interesting to note that when $\alpha=1$, the above distribution simplifies to:

$$P(0) = 1 - ns/N \quad \text{Employee not chosen}$$
$$P(1) = ns/N \quad \text{Employee chosen}$$

This is the expected probability of not choosing or choosing an individual during the year, i.e., simple random sampling without replacement.

On the other hand, if $\alpha=0$, then the composite distribution becomes the binomial distribution:

$$P(x) = \binom{s}{x} \left[ \frac{n}{N} \right]^x \left[ 1 - \frac{n}{N} \right]^{s-x} \quad x = 0,1,2,3,\ldots,s$$

which is simple random sampling with replacement.

SAMPLE SIZE

To determine the sample size, n, such that the probability of not testing an individual, $P(X=0)$, is in general $p_o$, then the following equation must be solved for n:

$$p_o = 1 - \frac{1}{1-\alpha} \left[ 1 - \left[ 1 - \frac{(1-\alpha)n}{N} \right]^s \right]$$

-continued $$1 - (1 - p_o)(1 - \alpha) = \left[1 - \frac{(1 - \alpha)n}{N}\right]^s$$

Taking the natural log of both sides gives:

$$\ln[1 - (1 - p_o)(1 - \alpha)] = s \ln\left[1 - \frac{(1 - \alpha)n}{N}\right]$$

In most drug screening programs, the number of random selections per year is greater than just a few. Often the selections are taken weekly or daily. Even if the selections are done monthly, the sample size n per selection is very small relative to the population size N. If n is very small relative to N, then the fraction $1-(1-\alpha)n/N$ is close to 1. It is then reasonable to approximate the right-hand side of the above equation with right-hand side of the following equation:

$$\ln - [1 - 1 - p_o)(1 - \alpha)] = -\frac{s(1 - \alpha)n}{N}$$

Solving for n, gives:

$$n = -\frac{N}{(1 - \alpha)s} \ln[1 - (1 - p_o)(1 - \alpha)] \quad 0 \leq \alpha < 1 \quad (2.1)$$
$$= (1 - p_o) N/s$$

Since the sample size must be an integer, the smallest integer greater than or equal to n, called the ceiling of n, is chosen. In some cases, generally when N is several hundred or less, choosing the ceiling of n will cause $p_o$ to be negative.

Solving Equation 2.1 for $p_o$, quickly checks for a negative value of $p_o$ for some integer n in the following equation:

$$p_o = 1 - \frac{1 - \exp[-n(1 - \alpha)s/N]}{1 - \alpha}$$

In cases where $p_o$ would be negative, it might be wiser to randomly choose the sample size for each sample as follows:

If n minus the absolute value of n is less than a uniform random number on the range of zero to one then n should be set equal to the absolute value of n, otherwise n should be set equal to the absolute value of n plus one.

For given values of $p_o$ and $\alpha$, n can be expressed as a percentage of N/s by using either of the above equations. This percentage is the rate of yearly sampling and is expressed as follows:

$$R = -\frac{100}{s} \ln[1 - (1 - p_o)(1 - \alpha)] \quad 0 \leq \alpha < 1$$
$$= 100(1 - p_o)$$

For example, if $p_o=0.05$ and $\alpha=0.5$, then R approximately equals 130%. For this example, if the population size is 1,000, then 1,300 drug screening tests should be conducted during the year.

PARAMETER $\alpha$

As previously mentioned, $\alpha$ is the proportion of sampling effort that is done on the population of employees in which each employee can be chosen only once. FIG. 4 illustrates the effect of the parameter $\alpha$ in the composite random sampling distribution. In this figure, $p_o$, the probability of not being selected has been set equal to 0.05. The ordinate is R, the rate of yearly sampling. The abscissa is $\alpha$. From this figure, when $\alpha=0$, 0.25, 0.5, 0.75 and 1, R is approximately 300%, 166%, 130%, 108% and 95% respectively.

The choice of $\alpha$ is a management decision. When $\alpha$ is 0 (simple random sampling with replacement), there is a considerable amount of replicated sampling on many individuals, the great majority of whom never needed to be tested in the first place. When $\alpha$ is 1, there is no replicate sampling. This would not be an effective value because without some replicate sampling, there is little or no deterrent effect. Hence, a value of $\alpha$ between 0 and 1 is desirable.

As $\alpha$ increases from 0 to 1, the rate of sampling decreases (FIG. 4). As the rate decreases, so does the cost because fewer people are being tested. Additionally, the aggravation to employees is reduced as $\alpha$ increases. However, in order to maintain a deterrent to drug use, some replicate sampling is necessary. For these reasons, a value of 0.5 for $\alpha$ is suggested. Using equations 1.1 and 1.2, the expected probability distribution can be determined for any value of $\alpha$.

In order to clarify the effect of composite random sampling versus simple random sampling with replacement, a value of $\alpha=0.5$ with $p_o=0.05$ is taken. These values generate a yearly sampling rate of 130% under composite random sampling (FIG. 3). Applying the same sampling rate of 130% to simple random sampling generates the distribution of FIG. 2. The same effort under simple random sampling gives a higher probability of not being sampled, that is $p_o=0.275$, as well as a higher probability of being sampled three or more times.

FIG. 1 illustrates prior art simple random sampling, where p is fixed at 0.05 and the rates between sampling methods are allowed to vary. This method requires a 300% yearly sampling rate and there is a very high degree of replicated sampling.

IMPLEMENTING COMPOSITE RANDOM SAMPLING

I. Determine Sample Size

Step 1: Since the number of employees is variable from sample to sample, it is necessary to read through the data file of employees to determine population size before each selection sequence. As the file is read, count the number of employees not tested within the last year. Denote this number as $N_1$.

Step 2: Count the total number of employees. Denote this number $N_M$. [N and $N_M$ represent the same total population size; $N_M$ will be used for subscript consistency.]

Step 3: Determine the sample size n, generate n random numbers between 0 and 1, and count the number of random numbers less than $\alpha$. Label this number as $n_1$, the number of employees to be selected from the single selection population $P_1$. The $n_M=n-n_1$; this is the number of employees to be selected from the multiple-selection population $P_M$.

Step 4: Once the above parameters have been determined, the employee file can be read and selections can be made. FIG. 5 represents the logic process for selection. In the figure, r represents a random number from a random number generator.

II. Determine the Rate of Selection to Actual Testing

Consideration 1. In any sampling program, some individuals are selected but are not able to be tested on that day. Some of these occurrences will be excused absences, others are not. In any case, it is necessary to estimate the average absence rate in order to make adjustments in the sample size to account for those not tested. If this rate is denoted by A, then the selection sample size is calculated as follows:

$$n = -\frac{AN_M}{(1-\alpha)s} \ln[1-(1-p_o)(1-\alpha)] \quad 0 \leq \alpha < 1 \quad (3.1)$$
$$= (1-p_o)AN_M/s$$

For example, if the desired number of individuals to be tested daily is 20, and on the average 1 individual is excused for illness and 1 for other legitimate reasons, the desired selection sample size is 22. Hence, the inflation factor A would be 22/20 = 1.1.

Consideration 2. Changes in the target population over time also influence the sample size required to obtain a fixed probability of not testing an individual, $p_o$. The magnitude of these changes varies directly with the selection size inflation factor; however, it is difficult to estimate this factor directly. Including absences, it is suggested that A be set to 1.1 as a starting value. Periodic adjustments to A can be made after examining for goodness-of-fit between the empirical and theoretical distributions as described below.

FLOW DIAGRAM OF FIG. 5

Two input files are required for composite random sampling which are described in relation to an element being an employee required to be periodically tested. The terms element and employee are used interchangeably in describing the flow chart of FIGS. 5a and 5b.

The first file is the parameter file 1. The parameters are the constants that define a particular sampling distribution. The distribution is the expected number of times an employee is selected during any year period of time. This input file contains the following parameters:

$N_1$—the number of elements not tested within a one year window (data base 2), $N_M$—the total number of elements available for testing (data base 1), $\alpha$—the proportion of elements taken from the population sampled without replacement, s—the number of samples per year, $p_o$—the probability of not choosing an element during a year, and A—an adjustment number that is usually used to increase the number of elements selected. Further discussion of this parameter follows below.

From these input parameters the selection sample size is calculated as follows:

$$n = -\frac{AN_M}{(1-\alpha)s} \ln[1-(1-p_o)(1-\alpha)] \quad 0 \leq \alpha < 1$$
$$= (1-p_o)AN_M/s \quad \alpha = 1$$

There are two considerations when choosing "A". They are as follows:

Consideration 1. In any sampling program, some elements are selected but are not able to be tested on that day. Some of these occurrences will be excused absences, others are not. In any case, it is necessary to estimate the average absence rate in order to make adjustments in the sample size to account for those not tested. For example, if the desired number of individuals to be tested daily is 20, and on the average 1 individual is excused for illness and 1 for other legitimate reasons, the desired selection sample size is 22. Hence, the adjustment number "A" would be 22/20 = 1.1.

Consideration 2. Changes in the target population over time also influence the sample size required to obtain a fixed probability of not testing an individual, $p_o$. The magnitude of these changes varies directly with the selection size adjustment number; however, it is difficult to estimate this factor directly. Including absences, it is suggested that "A" be set to 1.1 as a starting value. Periodic adjustments to "A" can be made after examining for goodness-of-fit between the empirical and theoretical distributions.

Because the sample size "n" is usually not an integer, the integer value of "n" should be chosen as follows:

If n minus the absolute value of n is less than a uniform random number on the range of zero to one then n should be set equal to the absolute value of n, otherwise n should be set equal to the absolute value of n plus one.

Once the integer value of "n" is determined, it is necessary to determine the number of elements taken from the whole target population (data base 1), "$n_M$", and the number taken from the population sampled without replacement (data base 2), "$n_1$", where "n" equals the sum of "$n_1$", and "$n_M$". "$n_1$" is determined by looping through the question "is a uniform random number on the range of zero to one less than "$\alpha$"?" and counting the number of times the question is true. "$n_M$" is the difference between "n" and "$n_1$".

The next step is to input the target population from input data file 2. The data set contains at least two fields: the element identification, and the corresponding date of last testing. As a caution, it should be noted that an element selected may not be necessarily tested.

The following steps relate to the actual selection process as indicated in block 3. The first question is, has the element been selected within the last 365 days? "r" represents a uniform random number on the range from 0 to 1. "Y" and "N" represent "yes" and "no" paths.

Y  Is r less than $n_M/(N_M - n_1)$?
   YY  select the element and set $n_M = n_M - 1$
   YN  do nothing
   Set $N_M = N_M - 1$
Branch to the beginning of block 4.
N  Is r less than $\alpha$?
   NY  Is r less than $n_1/N_1$?
      NYY  select the element and set $n_1 = n_1 - 1$
      NYN  Is r less than $n_M/(N_M - n_1)$?
         NYNY select the element and set $n_M = n_M - 1$
         NYNN do nothing
   Set $N_1 = N_1 - 1$
   and $N_m = N_M - 1$
   Branch to the beginning of block 4.
   NN  Is r less than $n_M/(N_M - n_1)$?
      NNY  select the element and set $n_M = n_M - 1$
      NNN  Is r less than $n_1/N_1$?
         NNNY select the element and set $n_1 = n_1 - 1$
         NNNN do nothing
   Set $N_1 = N_1 - 1$ -continued

```
and N_M = N_M - 1
Branch to the beginning of block 4.
In decision block 4, are both n_1 and n_M greater than zero?
    if true, branch to the beginning of block 3,
    if false, branch to the beginning of block 5.
At decision block 5:
Is n_1 equal to zero?
Y  Is n_M equal to zero?
   YY  End of selection process.
   YN  Is r less than n_M/N_M?
       YNY  select the element and set n_M = n_M - 1
       YNN  do nothing
   Set N_M = N_M - 1
   Branch to the beginning of block 5.
N  Has the element been selected within the last
   365 days?
   NY  Branch to the beginning of block 5.
   NN  Is r less than n_1/N_1 ?
       NNY  select the element and set n_1 = n_1 - 1
       NNN  do nothing
   Set N_1 = N_1 - 1
   Branch to the beginning of block 5.
```

III. Comparing the Empirical and Theoretical Distributions

The progress of the testing rate in order to meet the goal of the sampling program is evaluated. The chi-square test for goodness-of-fit can be used to assess agreement between the empirical and theoretical frequency distributions. If the goodness-of-fit test fails, then usually an adjustment to the inflation factor, A, is the only action necessary to get agreement between the two distributions as the sampling program continues.

The theoretical distribution at any time during the year is identical in form to equations above but is rewritten as follows:

$$P(0) = 1 - \left[\frac{1}{1-\alpha}\left[1 - \left[1 - \frac{(1-\alpha)n}{N_M}\right]^w\right]\right]$$

$$P(x) = \frac{1}{1-\alpha}\binom{w}{x}\left[\frac{(1-\alpha)n}{N_M}\right]^x\left[1 - \frac{(1-\alpha)n}{N_M}\right]^{(w-z)}$$

$$x = 1,2,3,\ldots,w$$

where w is the $w^{th}$ sample of the year, n is the sample size calculated from first equation, and $N_M$ is the number of individuals that have been in the population from the beginning of the test year to the $w^{th}$ sample.

Individuals who have not been in the population during the entire test period should not be considered when determining $N_M$. The distribution for these individuals can be displayed, but there is no theoretical distribution with which to compare it.

EXAMPLE

Currently, composite random sampling is being used at the Southern California Edison Company, the assignee of the Applicant. The empirical distribution of the number of times individuals have been selected from this utility application has compared well with the theoretical distribution.

Over the six month study period, the population size $N_M$ has varied from a low of approximately 3,000 to a high of approximately 4,000. Accordingly, the sample size has varied from 17 to 23 per day. For this application, the model parameters have been set as follows:

$\alpha = 0.5$
$p_o = 0.05$
$s = 250$ (work days per year)
$w = 122$ (days sampled to date)
$A = 1.1$ Before the theoretical frequency distribution can be compared to the empirical distribution, the target population must be divided into two population groups. The first population is referred to as the steady-state population. These are the individuals who have been subject to random selection from the first day of the selection process. After the first anniversary of the selection process, the steady-state population comprises individuals who have been subject to random selection continually for a year. The individuals not in the steady-state population are referred to as the short-term population.

Figure 6:
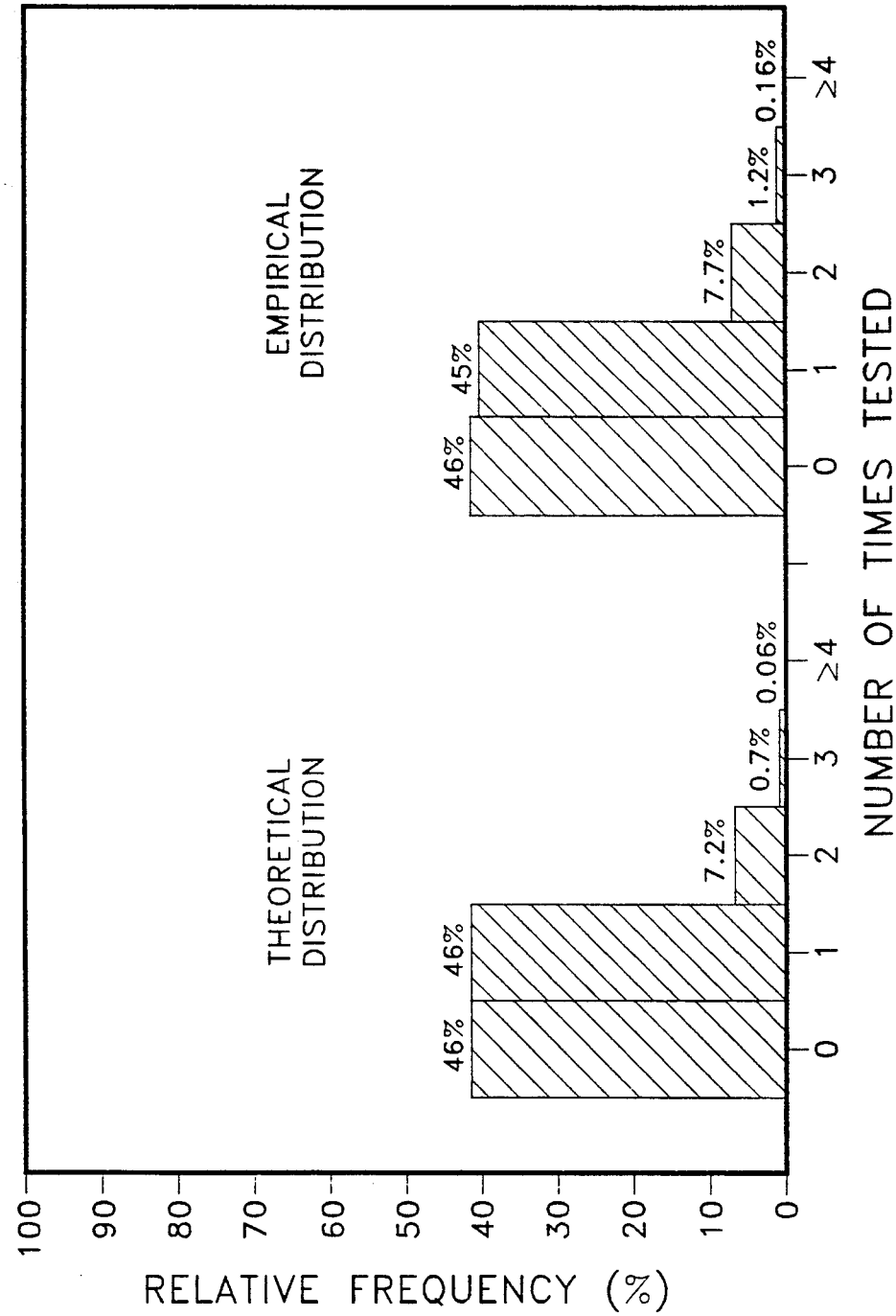
FIG. 6 is a comparison of the theoretical and empirical distributions for a six month case study for individuals that were available to be tested during the whole sampling period.

Using the population size from the steady-state population, a chi-square goodness-of-fit test can be done between the theoretical and empirical frequency distributions of the steady-state populations. The relative frequency of these theoretical and empirical distributions are illustrated in FIG. 6. Grouping the last two categories into a 3 or more category and using a steady-state population size of 2421, the chi-square value for this test is 8.14. With 3 degrees of freedom, the tabled value for chi-square is 11.3 at the 99% level. Hence, we can conclude the distributions are not significantly different at the 99% level.

Figure 7:
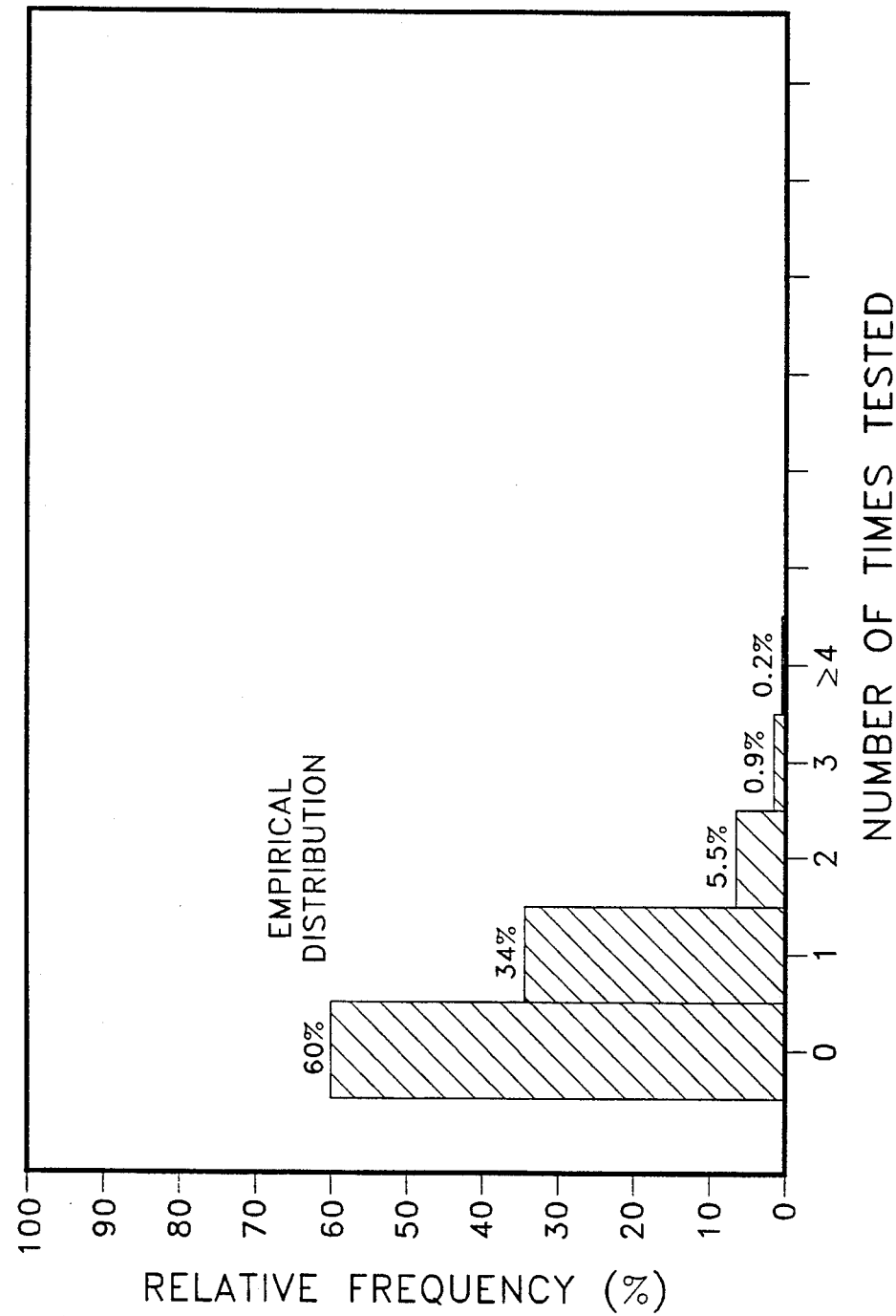
FIG. 7 is an empirical distribution of individuals that entered the population after the beginning of the sampling period.

The empirical frequency distribution for the short-term population of FIG. 7 cannot be compared to a theoretical distribution because individuals within the population are subject to testing for different lengths of time.

CONCLUSION

Composite random sampling combines random sampling with replacement and random sampling without replacement. By selecting the proportion of time that one chooses sampling without replacement versus sampling with replacement, one can control the shape of the composite distribution. The advantage that this technique brings to a drug screening program is a balance between detecting drug use and fairness to employees. This sampling procedure does not discriminate against some employees by over-selection or biased selection. Also, the cost is reduced by lowering the number of multiple tests given to employees during the year.

Many more examples of the invention exist, each differing from the other on matters of detail only. The invention is to be considered in terms of the following claims.

I claim:

1. A method of sampling from a defined group so that at least a minimum number of elements in the defined group are targeted at a first desired frequency and an overall number of elements are not targeted more than at a second desired frequency thereby to create a target element range comprising the steps of:

(a) establishing a first data base constituted by essentially all the elements of the defined group, (b) establishing a second data base with initially all the elements of the first data base, (c) selecting a first element set from the first data base and thereafter replacing the selected first element set in the first data base so as to maintain the first data base essentially unchanged, (d) removing from the second data base any element set existing in that second data base selected from the first data base, (e) selecting a second element set from the second data base, (f) removing from the second data base element sets selected from the second data base, (g) defining the first element set from the first data base and the second element set from the second data base as the target elements in the target element range, and (h) selectively varying the amount of the first element set relative to the amount of the second element set as the target elements thereby to develop a predetermined frequency distribution of targeted elements in the range.

2. A method as claimed in claim 1 including tracking the selection of an element set from the second data base and reentering a removed element back into the second data base after a predetermined time period of not being selected from either the first data base or the second data base.

3. A method as claimed in claim 1 wherein the second data base is in subset of the first data base.

4. A method as claimed in claim 1 including applying the target elements to a predetermined test.

5. A method as claimed in claim 1 wherein the element is selectively animate or inanimate.

6. A method as claimed in claim 2 wherein the element is a human.

7. A method as claimed in claim 2 wherein the test is a qualitative or quantitative test of the element.

8. A method as claimed in claim 2 wherein when the element is a human, the target human is subjected to a performance test.

9. A method as claimed in claim 6 wherein the performance test is a medical test.

10. A method as claimed in claim 9 wherein the medical test is a test for selected abusive substances within the human.

11. A method as claimed in claim 1 including the step of selecting a targeting rate over a predetermined time interval.

12. A method as claimed in claim 9 wherein the target rate is selected at a level commensurate with retaining the first desired frequency rate and second desired frequency rate between a first predetermined level and a second predetermined level.

13. A method as claimed in claim 10 wherein the target rate is selected at a level no greater than is necessary to maintain the element frequency rate between the first and second predetermined levels.

14. A method as claimed in claim 10 including selecting the target rate equal to a rate to insure targeting of each element in the group at least once in a predetermined time interval and such that the targeting rate is no greater than about 150% relative the number of elements in the group, and wherein 100% represents the number of elements in the group.

15. A method as claimed in claim 12 wherein the first desired frequency is about 0 and wherein the second desired frequency is about 3 and the targeting rate is about 130%.

16. A method as claimed in claim 1 including adjusting the selection from the first data base and the second data base to account for changes in the defined group.

17. A method as claimed in claim 16 wherein changes are selectively increases or decreases in the defined group.

18. A method as claimed in claim 15 wherein adjusting includes the step of adding additional elements to or removing preexisting elements from the first data base and adding additional elements to or removing preexisting elements from the second data base, such additional elements having become available to the group after initiation of the initial establishment of the first data base and second data base, and such preexisting elements having left the group after initiation of the first data base and the second data base.

19. A method as claimed in claim 1 wherein a nondefining of an element according to (g) is effected according to:

$$P(O) = 1 - \left[ \frac{1}{1-\alpha} \left[ 1 - \left[ 1 - \frac{(1-\alpha)n}{N} \right]^s \right] \right]$$

and the number of times an element has been defined according to (g) is effected according to:

$$P(X) = \frac{1}{1-\alpha} \binom{s}{x} \left[ \frac{(1-\alpha)n}{N} \right]^x \left[ 1 - \frac{(1-\alpha)n}{N} \right]^{(s-x)}$$

$$x = 1,2,3,\ldots,s$$

where
- $\alpha$ is the proportion of the target elements taken from the second data base,
- n is the number of target elements,
- N is the number of elements in the first data base,
- s is the number of samples per predetermined time period, and
- p is the probability of selection of an element.

20. A method of sampling from a defined group of humans so that at least a minimum number of humans in a defined group are targeted at a first desired frequency during a selected time interval and an overall number of humans in the group are not targeted more frequency than at a second desired frequency thereby to create a target human range in a predetermined time interval comprising the steps of:

(a) establishing a first data base constituted by essentially all the elements of the defined group, (b) establishing a second data base of humans with initially all the humans of the first data base, (c) selecting a first human set from the first data base and thereafter replacing the selected first human set in the data base so as to maintain the first data base essentially unchanged, (d) removing from the second data base any human set existing in that data base selected from the first data base, (e) selecting a second human set from the second data base, (f) removing from the second data base a human set selected from the second data base, (g) defining the first human set from the first data base and the human set from the second data base as the target humans, and (h) selectively varying the amount of the first element set relative to the amount of the second element set so as to be relatively unequal as the target elements thereby to develop a predetermined frequency distribution of targeted elements in the range.

21. A method as claimed in claim 18 including applying a physical test to the selected human, the physical test being to determine a medical status of the human.

22. A method as claimed in claim 21 wherein the medical status being checked is the determination of substance abuse materials within the human anatomy.

23. A method of sampling from a defined group so that at least a minimum number of elements in the defined group are targeted at a first desired frequency and an overall number of elements are not targeted more than at a second desired frequency thereby to create a target element range comprising the steps of:
   (a) establishing a first data base constituted by essentially all the elements of the defined group,
   (b) establishing a second data base with initially all the elements of the first data base,
   (c) selecting a first element set from the first data base and thereafter replacing the selected first element set in the first data base so as to maintain the first data base essentially unchanged,
   (d) removing from the second data base any element set existing in that second data base selected from the first data base,
   (e) selecting a second element set from the second data base,
   (f) removing from the second data base an element set selected from the second data base,
   (g) wherein a target element selected during a first time interval towards the beginning of a predetermined time period is selected again at a second time interval towards the end of the predetermined time periods, and
   (h) selectively varying the amount of the first element set relative to the amount of the second element set so as to be relatively unequal as the target elements thereby to develop a predetermined frequency distribution of targeted elements in the range.

24. A method as claimed in claim 19 wherein the second data base is maintained at a level greater than zero.

25. A method of sampling from a defined group of humans so that at least a minimum number of humans in a defined group are targeted at a first desired frequency during a selected time interval and an overall number of humans in the group are not targeted more frequency than at a second desired frequency thereby to create a target human range in a predetermined time interval comprising the steps of:
   (a) establishing a first data base constituted by essentially all the elements of the defined group,
   (b) establishing a second data base of humans with initially all the humans of the first data base,
   (c) selecting a first human set from the first data base and thereafter replacing the selected first human set in the first data base so as to maintain the first data base essentially unchanged,
   (d) removing from the second data base any human set existing in that second data base selected from the first data base,
   (e) selecting a second human set from the second data base,
   (f) removing from the second data base a base human set selected from the second data base,
   (g) defining the first human set from the first data base and the human set from the second data base as the target humans,
   (h) wherein a target human selected during a first time interval towards the beginning of a predetermined time period is selected again at a second time interval towards the end of the predetermined time period, and
   (i) means for selectively varying the amount of the first element set relative to the amount of the second element set as the target elements thereby to develop a predetermined frequency distribution of targeted elements in the range.

26. A method as claimed in claim 24 wherein the second data base is a subset of the first data base.

27. A method of sampling from a defined group so that at least a minimum number of elements in the defined group are targeted at a first desired frequency and an overall number of elements are not targeted more than at a second desired frequency thereby to create a target element range comprising:
   (a) means for establishing a first data base constituted by essentially all the elements of the defined group,
   (b) means for establishing a second data base with initially all the elements of the first data base,
   (c) means for selecting a first element set from the first data base and thereafter replacing the selected first element set in the first data base so as to maintain the first data base essentially unchanged,
   (d) means for removing from the second data base any element set existing in that second data base selected from the first data base,
   (e) means for selecting a second element set from the second data base,
   (f) means for removing from the second data base an element set selected from the second data base,
   (g) means for defining the first element set from the first data base and the second element set from the second data base as the target elements in the target element range, and
   (h) means for selectively varying the amount of the first element set relative to the amount of the second element set as the target elements thereby to develop a predetermined frequency distribution of targeted elements in the range, and
   (i) means for presenting the sampling result.

28. A product as claimed in claim 27 wherein the element is a human.

29. A product for sampling from a defined group of humans so that at least a minimum number of humans in a defined group are targeted at a first desired frequency during a selected time interval and an overall number of humans in the group are not targeted more frequently than at a second desired frequency thereby to create a target human range in a predetermined time interval comprising:
   (a) means for establishing a first data base constituted by essentially all the elements in the defined group,
   (b) means for establishing a second data base of humans with initially all the humans of the first data base,
   (c) means for selecting a first human set from the first data base and thereafter replacing the selected first human set in the first data base so as to maintain the first data base essentially unchanged,
   (d) means for removing from the second data base any human set existing in that second data base selected from the first data base,
   (e) means for selecting a second human set from the second data base, (f) means for removing from the second data base a human set selected from the second data base, (g) means for defining the first human set from the first data base and the human set from the second data base as target humans, (h) wherein a target human selected during a first time interval towards the beginning of a predetermined time period is selected again at a second time interval towards the end of the predetermined time period, and (i) means for selectively varying the amount of the first element set relative to the amount of the second element set as the target elements thereby to develop a predetermined frequency distribution of targeted elements in the range, and (j) means for presenting the sampling result.

30. A method of sampling from a defined group so that at least a minimum number of elements in the defined group are targeted at a first desired frequency and an overall number of elements are not targeted more than at a second desired frequency thereby to create a target element range comprising the steps of:

(a) establishing a first data base constituted by essentially all the elements of the defined group, (b) establishing a second data base with initially all the elements of the first data base, (c) selecting a first element set from the first data base and thereafter replacing the selected first element set in the first data base so as to maintain the first data base essentially unchanged, (d) removing from the second data base any element set existing in that second data base selected from the first data base, (e) selecting a second element set from the second data base, (f) removing from the second data base element sets selected from the second data base, (g) defining the first element set from the first data base and the second element set from the second data base as the target elements in the target element range, and (h) wherein a non-defining of an element is effected according to:

$$P(O) = 1 - \left[ \frac{1}{1-\alpha} \left[ 1 - \left[ 1 - \frac{(1-\alpha)n}{N} \right]^s \right] \right]$$

and the number of times an element has been defined according to (g) is effected according to:

$$P(X) = \frac{1}{1-\alpha} \binom{s}{x} \left[ \frac{(1-\alpha)n}{N} \right]^x \left[ 1 - \frac{(1-\alpha)n}{N} \right]^{(s-x)}$$

$$x = 1,2,3,\ldots,s$$

where $\alpha$ is the proportion of the target elements taken from the second data base, n is the number of target elements, N is the number of elements in the first data base, s is the number of samples per predetermined time period, and P is the probability of selection of an element.

31. A method as claimed in claim 30 including selectively varying the amount of the first element set relative to the amount of the second element set so as to be relatively unequal as the target elements thereby develop a predetermined frequency distribution of targeted elements in the range.

32. A method as claimed in claim 30 including tracking the selection of an element set from the second data base and reentering a removed element back into the second data base after a predetermined time period of not being selected from either the first data base or the second data base.

33. A method as claimed in claim 30 wherein the second data base is in subset of the first data base.

34. A method of sampling from a defined group of humans so that at least a minimum number of humans in a defined group are targeted at a first desired frequency during a selected time interval and an overall number of humans in the group are not targeted more frequency than at a second desired frequency thereby to create a target human range in a predetermined time interval comprising the steps of:

(a) establishing a first data base constituted by essentially all the elements of the defined group, (b) establishing a second data base of humans with initially all the humans of the first data base, (c) selecting a first human set from the first data base and thereafter replacing the selected first human set in the data base so as to maintain the first data base essentially unchanged, (d) removing from the second data base any human set existing in that data base selected from the first data base, (e) selecting a second human set from the second data base, (f) removing from the second data base a human set selected from the second data base, (g) defining the first human set from the first data base and the human set from the second data base as the target humans, and (h) wherein a non-defining of an element is effected according to:

$$P(O) = 1 - \left[ \frac{1}{1-\alpha} \left[ 1 - \left[ 1 - \frac{(1-\alpha)n}{N} \right]^s \right] \right]$$

and the number of times an element has been defined according to (g) is effected according to:

$$P(X) = \frac{1}{1-\alpha} \binom{s}{x} \left[ \frac{(1-\alpha)n}{N} \right]^x \left[ 1 - \frac{(1-\alpha)n}{N} \right]^{(s-x)}$$

$$x = 1,2,3,\ldots,s$$

where $\alpha$ is the proportion of the target elements taken from the second data base, n is the number of target elements, N is the number of elements in the first data base, s is the number of samples per predetermined time period, and P is the probability of selection of an element.

35. A method as claimed in claim 34 including applying a physical test to the selected human, the physical test being selectively to determine a medical status of the human.

36. A method as claimed in claim 35 wherein the medical status being checked is the determination of substance abuse materials within the human anatomy.

* * * * *